United States Patent
Fore et al.

(10) Patent No.: US 7,120,826 B2
(45) Date of Patent: Oct. 10, 2006

(54) PARTIAL MIRRORING DURING EXPANSION THEREBY ELIMINATING THE NEED TO TRACK THE PROGRESS OF STRIPES UPDATED DURING EXPANSION

(75) Inventors: Richard Christopher Fore, Apex, NC (US); Vikram Harakere Krishnamurthy, Durham, NC (US); Luis Rene Quinones, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 10/113,338

(22) Filed: Mar. 29, 2002

(65) Prior Publication Data

US 2003/0188101 A1    Oct. 2, 2003

(51) Int. Cl.
*G06F 11/00* (2006.01)
(52) U.S. Cl. .................... 714/7; 714/6; 714/15
(58) Field of Classification Search .......... 714/5, 714/6, 7, 15
See application file for complete search history.

(56) References Cited

U.S. PATENT DOCUMENTS

| | | | | |
|---|---|---|---|---|
| 5,258,984 A | * | 11/1993 | Menon et al. ............... 714/7 |
| 5,315,602 A | | 5/1994 | Noya et al. .............. 371/40.4 |
| 5,333,305 A | | 7/1994 | Neufeld .................... 395/575 |
| 5,357,509 A | * | 10/1994 | Ohizumi .................... 714/7 |
| 5,390,187 A | * | 2/1995 | Stallmo ...................... 714/7 |
| 5,506,977 A | | 4/1996 | Jones ...................... 395/482 |
| 5,574,851 A | * | 11/1996 | Rathunde .................... 714/7 |
| 5,615,352 A | * | 3/1997 | Jacobson et al. .......... 711/114 |
| 5,657,439 A | * | 8/1997 | Jones et al. .................. 714/7 |
| 5,860,090 A | | 1/1999 | Clark ...................... 711/113 |
| 5,875,457 A | * | 2/1999 | Shalit ...................... 711/114 |
| 6,058,489 A | * | 5/2000 | Schultz et al. ............... 714/7 |
| 6,092,215 A | | 7/2000 | Hodges et al. ............... 714/6 |
| 6,101,615 A | | 8/2000 | Lyons ......................... 714/6 |
| 6,148,414 A | * | 11/2000 | Brown et al. ................. 714/9 |
| 6,154,853 A | * | 11/2000 | Kedem ........................ 714/6 |
| 6,233,648 B1 | | 5/2001 | Tomita ........................ 711/4 |
| 6,425,052 B1 | * | 7/2002 | Hashemi ................... 711/114 |
| 6,530,004 B1 | * | 3/2003 | King et al. ............... 711/165 |

* cited by examiner

*Primary Examiner*—Scott Baderman
*Assistant Examiner*—Gabriel L. Chu
(74) *Attorney, Agent, or Firm*—Robert A. Voigt, Jr.; Winstead Sechrest & Minick PC

(57) ABSTRACT

A method, system and computer program product for performing an expansion of a disk array. Upon the failure of a disk in the disk array, the failed disk may be rebuilt stripe by stripe in the spare units distributed among other disks in the disk array. Upon repairing or replacing the failed disk with a spare disk, the repaired or spare disk may be rebuilt stripe by stripe using the data from the spare units. Upon receiving a write request to a stripe unit that has been rebuilt in the repaired or spare disk during expansion, the data of the request may be written in the stripe unit requested. Further, the data written may be mirrored, i.e., copied and stored, in the spare unit corresponding to the stripe unit requested. By mirroring the data to the corresponding spare unit, tracking each stripe that was updated during expansion may be eliminated.

20 Claims, 7 Drawing Sheets

PARTIAL MIRRORING DURING EXPANSION THEREBY ELIMINATING THE NEED TO TRACK THE PROGRESS OF STRIPES UPDATED DURING EXPANSION

TECHNICAL FIELD

The present invention relates to the field of a Redundant Array of Independent Disks (RAID) storage system, and more particularly to partial mirroring during expansion thereby eliminating the need to track the progress of stripes updated during expansion.

BACKGROUND INFORMATION

As the performance of microprocessor and semiconductor memory technology improves, there is a need for improved data storage systems with comparable performance enhancements. Additionally, in enhancing the performance of data storage systems, there is a need for improved reliability of data stored. In 1988, a paper was published by Patterson, Gibson, Katz, A Case for Redundant Arrays of Independent Disks (RAID), International Conference on Management of Data, pgs. 109–116, June 1988. This paper laid the foundation for the use of redundant arrays of independent disks that would not only improve the data transfer rate and data I/O rate over a comparable single disk access, but would also provide error correction at a lower cost in data storage systems.

RAID may include an array of disks which may be coupled to a network server. The server, e.g., file server, database server, web server, may be configured to receive a stream of requests (Input/Output (I/O) requests) from clients in a network system to read from or write to particular disks in the RAID. The I/O requests may also be issued from an application within the server. The server may comprise a RAID controller which may be a hardware and/or software tool for providing an interface between the server and the array of disks. The server may forward the I/O requests to the RAID controller which may retrieve or store the requested data. Typically, the RAID controller manages the array of disks for storage and retrieval and views the disks of the RAID separately. The disks included in the array may be any type of data storage system which may be controlled by the RAID controller when grouped in the array.

The RAID controller may typically be configured to access the array of disks as defined by a particular "RAID level." The RAID level may specify how the data is distributed across the disk drives and how error correction is accomplished. In the paper noted above, the authors describe five RAID levels (RAID Level 1-RAID Level 5). Since the publication of the paper, additional RAID levels have been designated.

RAID levels are typically distinguished by the benefits included. Three key benefits which may be included in a RAID level are fault tolerance, data availability and high performance. Fault tolerance may typically be achieved through an error correction method which ensures that information can be reconstructed in the event of a disk failure. Data availability may allow the data array to continue to operate with a failed component. Typically, data availability may be achieved through a method of redundancy. Finally, high performance may typically be achieved by simultaneous access to multiple disk drives which results in faster I/O and data transfer requests.

Error correction may be accomplished, in many RAID levels, by utilizing additional parity data stored with the original data. Parity data may be utilized to recover lost data due to disk failure. Parity data may typically be stored on one or more disks dedicated for error correction only or distributed over all of the disks within an array.

By the method of redundancy, data may be stored in multiple disks of the array. Redundancy is a benefit in that redundant data allows the storage system to continue to operate with a failed component while data is being replaced through the error correction method. Additionally, redundant data is more beneficial than back-up data because back-up data is typically outdated when needed whereas redundant data is current when needed.

In many RAID levels, redundancy may be incorporated through data interleaving which distributes the data over all of the data disks in the array. Data interleaving is usually in the form of data "striping" in which data to be stored is broken down into blocks called "stripe units" which are then distributed across the array of disks. Stripe units are typically predefined as a bit, byte, block or other unit. Stripe units are further broken into a plurality of sectors where all sectors are an equivalent predefined size. A "stripe" is a group of corresponding stripe units, one stripe unit from each disk in the array. Thus, "stripe size" is equal to the size of a stripe unit times the number of data disks in the array.

In an example, RAID level 5 utilizes data interleaving by striping data across all disks and provides for error correction by distributing parity data across all disks. For each stripe, all stripe units are logically combined with each of the other stripe units to calculate parity for the stripe. Logical combination may be accomplished by an exclusive or (XOR) of the stripe units. For N physical drives, N−1 of the physical drives will receive a data stripe unit for the stripe and the Nth physical drive will receive the parity for the stripe. For each stripe, the physical drive receiving the parity data rotates such that all parity data is not contained on a single disk.

The array of disks in a RAID may include a disk commonly referred to as a "host spare" disk that is dedicated for storing data from a failed disk. The hot spare disk may be unused during normal operations, i.e., when there does not exist a failed disk. When a disk in the RAID fails, the data that used to be on the failed disk may be rebuilt to the hot spare disk. Once the failed disk is either repaired or replaced by a spare disk, the data on the repaired or spare disk may be rebuilt using the data on the hot spare disk.

In another embodiment, the hot spare disk may be distributed among the array of disks in the RAID to lessen the number of reads and writes to complete the rebuild. For example, each stripe may comprise a stripe unit designated to store data corresponding to a stripe unit from a failed disk. These stripe units designated to store data corresponding to a stripe unit from a failed disk in the same stripe may commonly be referred to as spare units. Hence, once a disk in the disk array in the RAID fails, the data that used to be on the failed disk may be rebuilt to spare units distributed among the remaining disks in the disk array. The process of reconstructing the data contained on the failed disk and copying it onto the spare unit of each stripe may be referred to as "compaction." Once the data contained on the failed disk has been rebuilt onto the spare unit of each stripe, the RAID may be said to be in a "compacted state." RAID may be said to be in a "compacted stated" since the number of active disks in the disk array is decreased by one.

Once the failed disk is either repaired or replaced by a spare disk, the data on the failed disk may be restored by copying back the spare unit data onto the corresponding stripe units in the repaired or spare disk stripe by stripe. The process of copying back the spare unit data onto the repaired or spare disk stripe by stripe may be referred to as "expansion." During the expansion process, each stripe that is updated, i.e., each stripe unit per stripe that is rebuilt in the repaired or spare disk, may be tracked. Typically, each stripe that is updated may be tracked by a table stored in a non-volatile memory in the RAID controller. Each stripe updated during the expansion process may be tracked in case the repaired or spare disk fails during the expansion process. If the repaired or spare disk fails during the expansion process, RAID is able to enter a compacted state since the last stripe updated is known. That is, the data that used to be on the failed disk up to the last stripe updated may be rebuilt to spare units distributed among the remaining disks in the disk array thereby allowing the disk array to enter a compacted state. However, persistently tracking each stripe updated during expansion is time-consuming. Furthermore, non-volatile memory is expensive.

It would therefore be desirable to eliminate the necessitating of tracking the stripes updated during expansion in order to enter a compacted state upon a failure of the updated disk during expansion.

SUMMARY

The problems outlined above may at least in part be solved in some embodiments by mirroring data from a write request to a spare unit corresponding to a stripe unit in a replaced or spare disk being rebuilt during expansion for each write request to a stripe unit in the replaced or spare disk that has already been rebuilt during the expansion process. By mirroring the data to the corresponding spare unit, the step of tracking each stripe that was updated during the expansion process may be eliminated since the disk array in the RAID may already be configured to enter a compaction state upon failure of the replaced or spare disk during the expansion process. The disk array may already be configured to enter a compaction state upon failure of the replaced or spare disk during the expansion process since the spare units contain a copy of the valid data stored in the corresponding stripe units in the replaced or spare disk.

In one embodiment of the present invention, a method for performing an expansion of a disk array in a RAID while eliminating the necessity of tracking the stripes updated during expansion may comprise the step of a physical disk in a disk array in the RAID failing. Upon the failure of a disk in the disk array in the RAID, the data of the failed disk may be distributed across spare units to transition to a compaction state. The process of reconstructing the data contained on the failed disk and copying it onto the spare unit of each stripe may be referred to as "compaction." Once the data contained on the failed disk has been rebuilt onto the spare unit of each stripe, the RAID may be said to be in a "compacted state." The RAID may be said to be in a "compacted stated" since the number of active disks in the disk array is decreased by one.

The failed disk may then be repaired or replaced with a spare disk. Upon repairing the failed disk or replacing the failed disk with a spare disk, the repaired or spare disk may be rebuilt stripe by stripe from the spare units distributed among other disks of the disk array. The process of rebuilding stripe units in the repaired or spare disk may commonly be referred to as expansion. During the expansion process, the following may occur.

A determination may be made as to whether a RAID controller received a write request to a stripe unit in the repaired or spare disk. If the RAID controller has not received a write request to a stripe unit of the repaired or spare, then a determination may be made as to whether the repaired or spare disk failed during the expansion process as discussed further below.

If the RAID controller has received a write request to a stripe unit of the repaired or spare disk, then a determination may be made as to whether the received write request was a write request for a stripe unit in the repaired or spare disk that was rebuilt during the expansion process.

If the RAID controller received a write request for a stripe unit in the repaired or spare disk that was rebuilt, then the data of the request may be written in the stripe requested. Further, the data written may be mirrored, i.e., copied and stored, in the spare unit corresponding to the stripe unit requested. The spare unit that corresponds to the stripe unit requested resides in the same stripe. By mirroring the data to the corresponding spare unit, the step of tracking each stripe that was updated during the expansion process may be eliminated since the disk array in the RAID may already be configured to enter a compaction state upon failure of the replaced or spare disk during the expansion process. The disk array may already be configured to enter a compaction state upon failure of the replaced or spare disk during the expansion process since the spare units contain a copy of the valid data stored in the corresponding stripe units in the replaced or spare disk.

Upon mirroring the data in the spare unit that corresponds to the stripe unit requested, a determination may be made as to whether the repaired or spare disk failed during the expansion process as discussed further below.

If the RAID controller received a write request for a stripe unit in the repaired or spare that was not rebuilt, then the data of the request may be written in the spare unit that corresponds to the stripe unit requested. The spare unit that corresponds to the stripe unit requested resides in the same stripe. Upon writing the data in the spare unit that corresponds to the stripe unit requested, a determination may be made as to whether the repaired or spare disk failed during the expansion process as discussed below.

As stated above, a determination may be made as to whether the repaired or spare disk failed during the expansion process. If the repaired or spare disk did not fail during the expansion process, a determination may be made as to whether the rebuilding of the repaired or spare disk is complete. If the rebuilding of the repaired or spare disk is completed, then the method is terminated. If the rebuilding of the repaired or spare disk is not completed, then another stripe unit in another stripe in the repaired or spared disk may be rebuilt.

If, however, the repaired or spare disk failed during the expansion process, then the disk array in the RAID may transition to the compaction state without any restructuring. The disk array may transition to the compaction state without any restructuring since the spare units contain a copy of the valid data stored in the stripe units in the replaced or spare disk during the expansion process as discussed above.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

It is noted that even though the following describes the present invention implementing a RAID level five implementation with distributed sparing that the present invention may be implemented using any redundant RAID level. It is further noted that a person of ordinary skill in the art would be capable of applying the principles taught in the figures and description describing the performance of an expansion of a disk array while eliminating the necessity of tracking the stripes updated during expansion for a RAID level five system with distributed sparing to any redundant RAID level.

Figure 1:
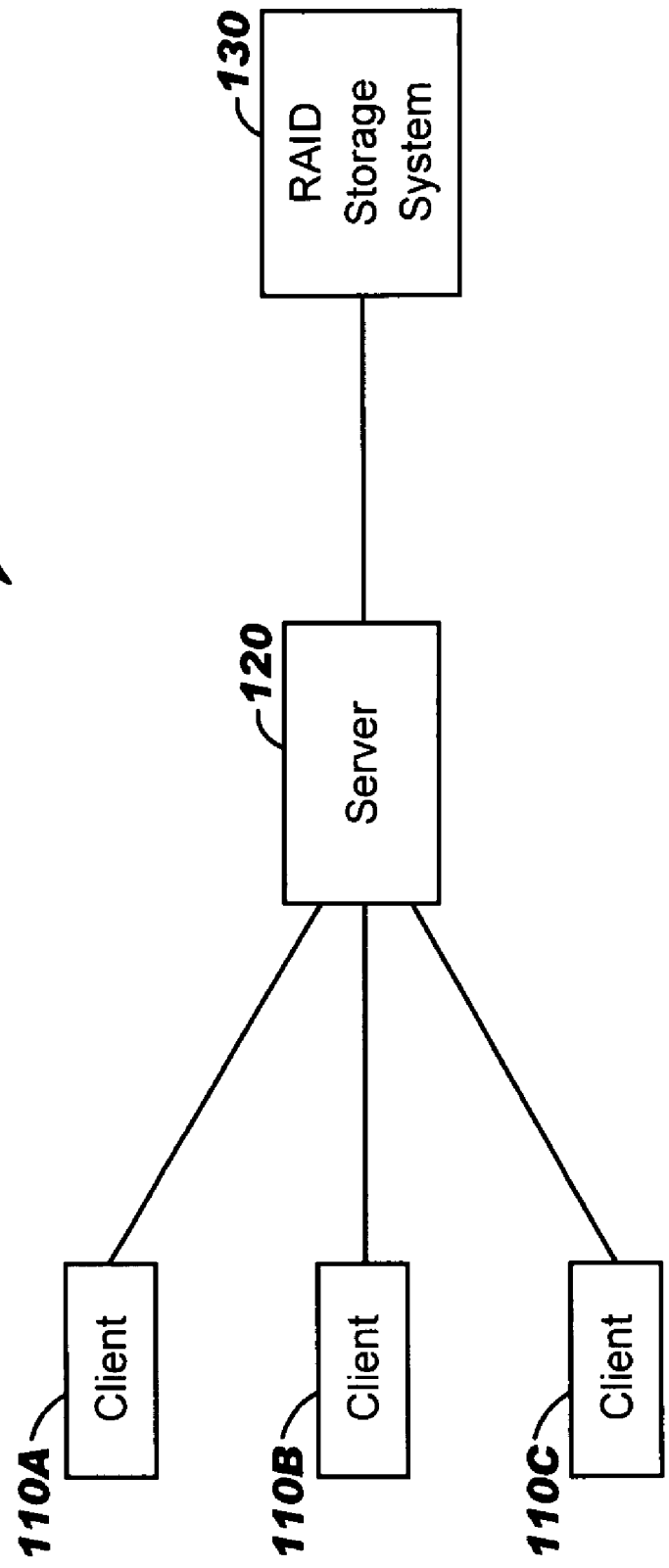
FIG. 1 illustrates a network system configured in accordance with the present invention.

FIG. 1—Network System

FIG. 1 illustrates one embodiment of the present invention of a network system 100. Network system 100 may comprise one or more clients 110A–D coupled to a server 120, e.g., file server, database server, web server. Server 120 may be coupled to a Redundant Array of Independent Disks (RAID) storage system 130. RAID storage system 130 may comprise an array of physical disks. Clients 110A–D may collectively or individually be referred to as clients 110 or client 110, respectively. Each client 110 may be configured to issue requests, e.g., read/write requests, to server 120 to read from or write to a particular disk in RAID storage system 130. A more detailed description of client 110 is provided below in conjunction with FIG. 2. Server 120 may be configured to forward the requests to a RAID controller to either retrieve from the requested disk in RAID storage system 130 the requested information or store in the requested disk in RAID storage system 130 the requested information. A more detailed description of server 120 is provided further below in conjunction with FIG. 3. A more detailed description of RAID controller is provided further below in conjunction with FIG. 4. It is noted that system 100 may comprise any number of clients 110 and servers 120 and that FIG. 1 is illustrative. It is further noted that in another embodiment, system 100 may only comprise server 120 coupled to RAID storage system 130 where an application in server 120 instead of client 110 generates requests, e.g., read/write requests, to read from or write to a particular disk in RAID storage system 130. It is further noted that network system 100 may be any type of system such as a file system or a database system and that FIG. 1 is not to be limited in scope to any one particular embodiment.

Figure 2:
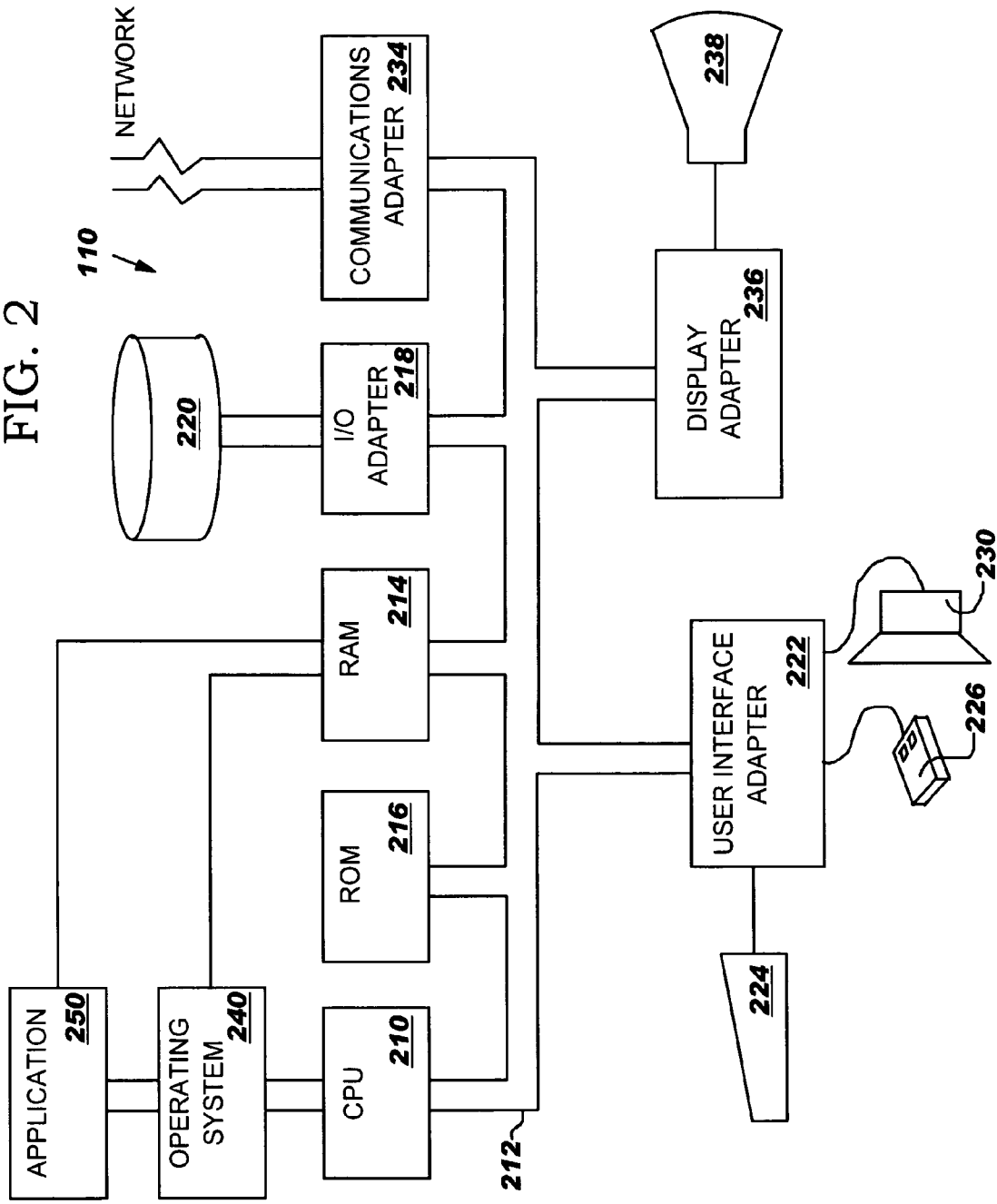
FIG. 2 illustrates an embodiment of the present invention of a client in the network system.

FIG. 2—Hardware Configuration of Client

FIG. 2 illustrates a typical hardware configuration of client 110 which is representative of a hardware environment for practicing the present invention. Client 110 may have a central processing unit (CPU) 210 coupled to various other components by system bus 212. An operating system 240 may run on CPU 210 and provide control and coordinate the functions of the various components of FIG. 2. An application 250 in accordance with the principles of the present invention may run in conjunction with operating system 240 and provide calls to operating system 240 where the calls implement the various functions or services to be performed by application 250. Read only memory (ROM) 216 may be coupled to system bus 212 and include a basic input/output system ("BIOS") that controls certain basic functions of client 110. Random access memory (RAM) 214, I/O adapter 218 and communications adapter 234 may also be coupled to system bus 212. It should be noted that software components including operating system 240 and application 250 may be loaded into RAM 214 which may be the computer system's main memory. I/O adapter 218 may be a small computer system interface ("SCSI") adapter that communicates with a disk unit 220, e.g., disk drive. Communications adapter 234 may interconnect bus 212 with an outside network enabling client 110 to communicate with server 120 via a Local Area Network (LAN), e.g., Ethernet, Token Ring, ARCnet or a Wide Area Network (WAN), e.g., Internet. Input/Output devices may also be connected to system bus 212 via a user interface adapter 222 and a display adapter 236. Keyboard 224, mouse 226 and speaker 230 may all be interconnected to bus 212 through user interface adapter 222. Event data may be inputted to client 110 through any of these devices. A display monitor 238 may be connected to system bus 212 by display adapter 236. In this manner, a user is capable of inputting to client 110 through keyboard 224 or mouse 226 and receiving output from client 110 via display 238 or speaker 230.

Figure 3:
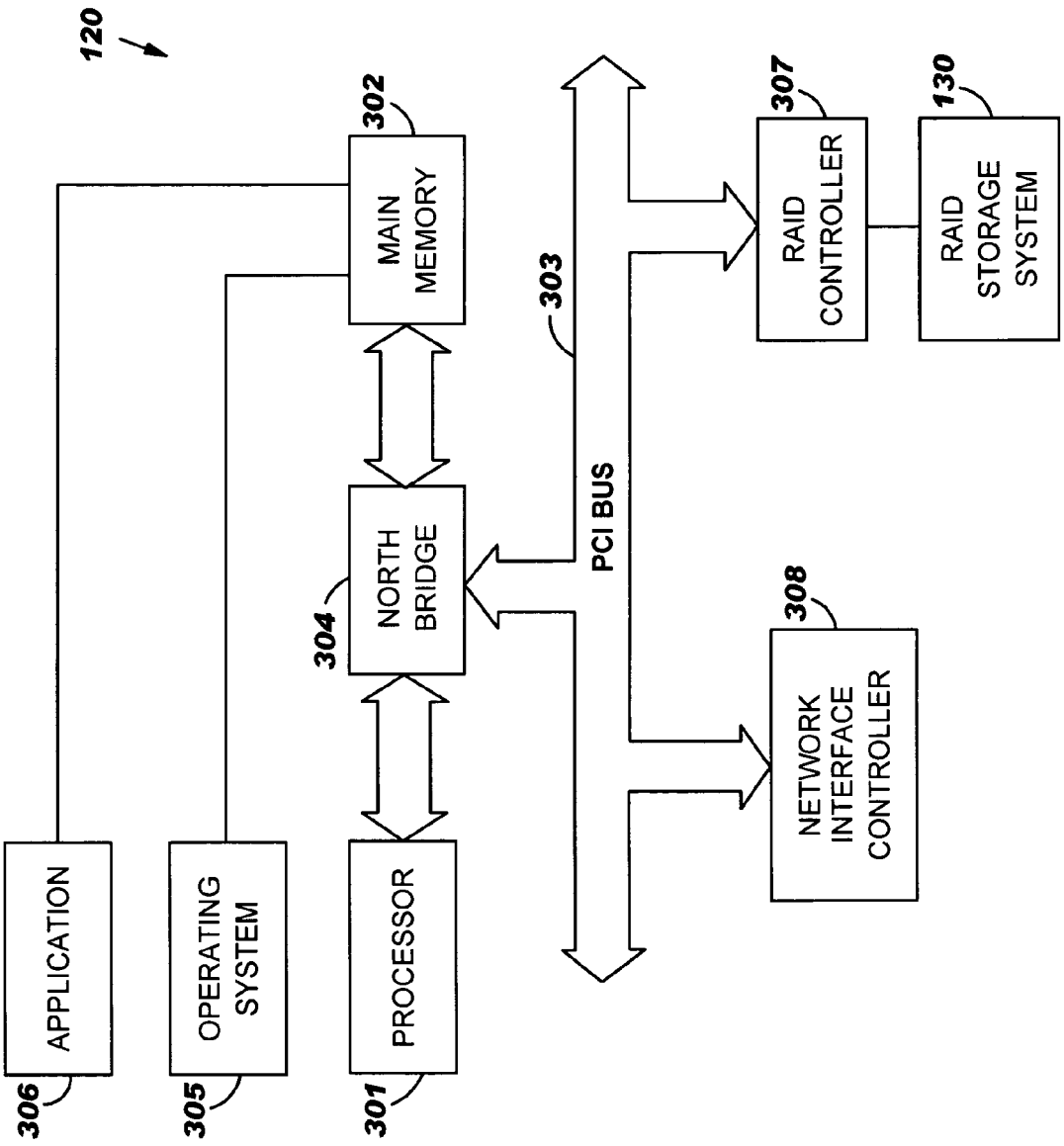
FIG. 3 illustrates an embodiment of the present invention of a server in the network system.

FIG. 3—Hardware Configuration of Server

FIG. 3 illustrates a typical hardware configuration of server 120 which is representative of a hardware environment for practicing the present invention. Server 120 may employ a peripheral component interconnect (PCI) local bus architecture. Although the depicted example employs a PCI bus, other bus architectures such as Accelerated Graphics Port (AGP) and Industry Standard Architecture (ISA) may be used. Processor 301 and main memory 302, e.g., Dynamic Random Access Memory (DRAM), Synchronous DRAM (SDRAM), may be connected to PCI local bus 303 through north bridge 304. North bridge 304 may also include an integrated memory controller and cache memory for processor 301. Furthermore, an operating system 305 may run on processor 301 to provide control and coordinate the functions of the various components of FIG. 3. An application 306 in accordance with the principles of the present invention may run in conjunction with operating system 305 and provide calls to operating system 305 where the calls implement the various functions or services to be performed by operating system 305 for application 306. It should be noted that software components including operating system 305 and application 306 may be loaded into system's main memory 302.

RAID controller 307 and network interface connection 308 may also be connected to PCI local bus 303. RAID controller 307 may be coupled to RAID storage system 130 thereby providing an interface between server 120 and RAID storage system 130. RAID controller 307 may be configured to receive requests, e.g., read/write requests, to read from or write to a particular disk in RAID storage system 130. A more detailed description of RAID controller 307 is provided below in FIG. 4. Network Interface controller 308 may interconnect PCI bus 303 with an outside network enabling server 120 to communicate with clients 110 or RAID storage system 130 via a Local Area Network (LAN), e.g., Ethernet, Token Ring, ARCnet or a Wide Area Network (WAN), e.g., Internet.

Those of ordinary skill in the art will appreciate that the hardware in FIG. 3 may vary depending on the implementation. Other internal hardware or peripheral devices, such as flash ROM (or equivalent non-volatile memory) or optical disk drives and the like, may be used in addition to or in place of the hardware depicted in FIG. 3. It is noted that the depicted example in FIG. 3 and the above described example are not meant to imply architectural limitations.

Figure 4:
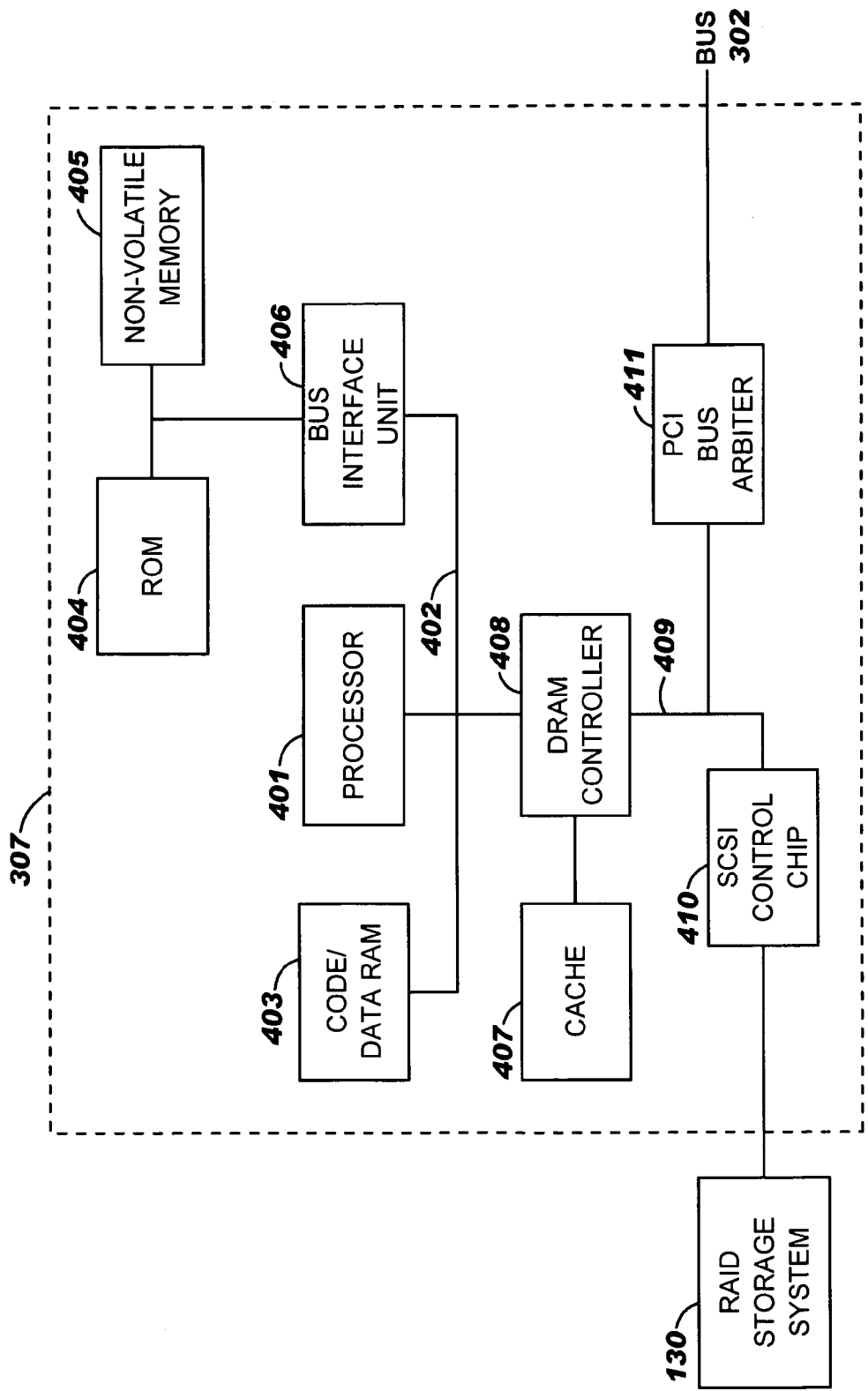
FIG. 4 illustrates a RAID controller configured in accordance with the present invention.

FIG. 4—RAID Controller

FIG. 4 illustrates an embodiment of RAID controller 307 configured in accordance with the present invention. As depicted, RAID controller 307 may comprise a processor 401 configured to control RAID storage system 130. Processor 401 may preferably be an advanced microprocessor which may be coupled to processor bus 402. As depicted, also coupled to processor bus 402 is code/data RAM 403 which may be utilized to temporarily store code and data utilized by processor 401. ROM 404 and non-volatile memory 405, e.g., ROM/DRAM, may be accessed utilizing an 8-bit bus and thus bus interface 406 may be utilized to interface those devices to processor bus 402, which typically utilizes a 32-bit bus.

Operational code may be stored within ROM 404, which, as those skilled in the art will appreciate, is generally provided utilizing so-called "flash" ROM. Operational code may thereafter be fetched from ROM 404 by processor 401 upon initiation of operation to direct the operation of processor 401 to perform functions including the functions of the present invention. Non-volatile memory 405 may be a low power CMOS memory which is powered up for "backup" by a battery such that the information stored in non-volatile memory 405 will not be lost when main power is terminated. Thus, non-volatile memory 405 may be utilized to store configuration data or operational code in a manner similar to that stored within ROM 404. ROM 404 may generally be updated at initial power application and any changes to system configuration during operation may be stored within non-volatile memory 405 and then entered into a "device change list" which may also be stored within non-volatile memory 405 and on each disk drive within the system. Furthermore, non-volatile memory 405 may store the program for performing an expansion of a disk array as described in conjunction with FIGS. 6A–B. It is noted that the program of the present invention that performs an expansion of a disk array as described in conjunction with the description of FIG. 4 may reside in other memory units, e.g., ROM 404, or within server 120, e.g., application 306.

A cache 407 may be coupled to DRAM/XOR controller 408. Cache 407 may be configured into a plurality of temporary storage positions for data. DRAM/XOR controller 408 may be utilized to control access to random access memory and also provides a hardware implemented exclusive or (XOR) circuit which may be utilized to rapidly and efficiently calculate parity for changes in updated data.

DRAM/XOR controller 408 may be coupled to local bus 409. Also coupled to local bus 409 may be one or more small computer system interface (SCSI) control chips 410. Each SCSI control chip 410 may be defined as including channels which may each support RAID storage system 130.

RAID controller 307 may further comprise a PCI bus adapter 411 configured to interconnect RAID controller 307 with PCI bus 303 (FIG. 3). In another embodiment, RAID controller 307 may further comprise an externally interfaced unit (not shown) configured to interconnect RAID controller 307 with PCI bus 303 (FIG. 3).

Those having ordinary skill in this art will appreciate that FIG. 4 is illustrative and that FIG. 4 is not meant to imply architectural limitations.

Figure 5:
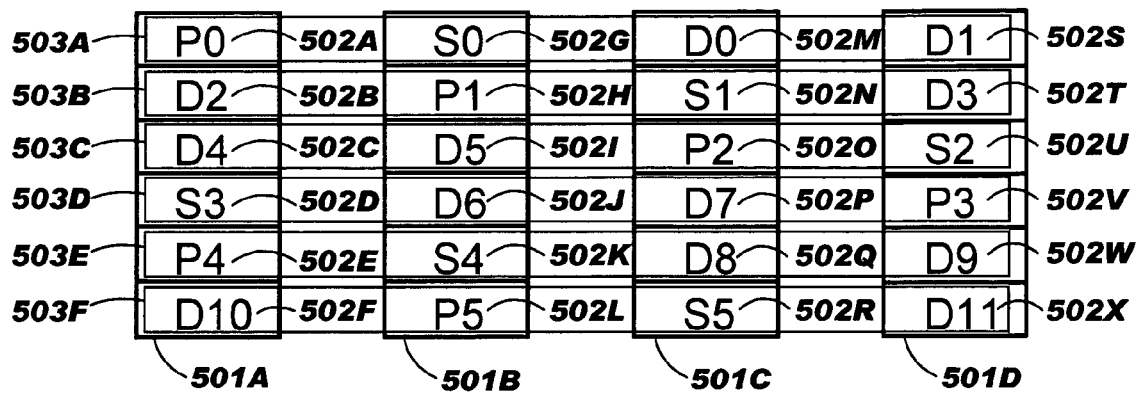
FIG. 5 illustrates an exemplary disk array of a RAID storage system implementing RAID level five with distributed sparing.

FIG. 5—RAID Level Five with Distributed Sparing

FIG. 5 illustrates RAID storage system 130 implementing RAID level five with distributed sparing where RAID level five uses data interleaving by striping data across all disks and provides for error correction by distributing parity data across all disks. Referring to FIG. 5, the disk array in RAID storage system 130 implementing RAID level five may comprise a plurality of physical disks 501A–D configured to store data including parity data. Physical disks 501A–D may collectively or individually be referred to as physical disks 501 or physical disk 501. It is noted that the disk array of RAID storage system 130 implementing RAID level five with distributing sparing may comprise any number of physical disks 501 and that FIG. 5 is illustrative.

Each physical disk 501 may comprise a plurality of units commonly referred to as stripe units 502A–X. For example, physical disk 501A may comprise stripe units 502A–F. Physical disk 501B may comprise stripe units 502G–L and so forth. Stripe units 502A–X may collectively or individually be referred to as stripe units 502 or stripe unit 502, respectively. It is noted that each physical disk 501 may comprise any number of stripe units 502. Each stripe unit 502 may be configured to store a predefined amount, e.g., bit(s), byte(s), of data including parity data. Stripe units 502 that are labeled with a "D" refers to stripe 502 that store non-parity data. Stripe units 502 that are labeled with a "P" refers to stripe units 502 that store parity data. Furthermore, some stripe units 502 in each physical disk 501 may be designated to store data from a corresponding stripe unit 502 of a failed disk. These stripe units 502 may commonly be referred to as spare units which are labeled with an "S." As illustrated in FIG. 5, the spare units are distributed among physical disks 501 such that each stripe unit 502 of a failed disk may be rebuilt. The distribution of spare units among physical disks 501 may commonly be referred to as "distributed sparing." For example, if disk 501D failed, then data labeled D1 in stripe unit 502S may be rebuilt in corresponding spare unit 502G labeled S0 in disk 501B. Data labeled D3 in stripe unit 502T may be rebuilt in corresponding spare unit 502N labeled S1 in disk 501C. Parity data labeled P3 in stripe unit 502V may be rebuilt in corresponding spare unit 502D in disk 501A. Data labeled D9 in stripe unit 502W may be rebuilt in corresponding spare unit 502K labeled S4 in disk 501B and so forth. This may commonly be referred to as distributed sparing. Additional details regarding distributing sparing are disclosed in U.S. Pat. No. 5,258,984 entitled "Method and Means for Distributed Sparing in DASD Arrays" which is hereby incorporated herein by reference in its entirety.

A stripe 503A–F may refer to a group of corresponding stripe units 502. For example, stripe 503A may include stripe units P0, S0, D0 and D1. Stripe 503B may include stripe units D2, P1, S1 and D3. Stripe 503C may include stripe units D4, D5, P2 and S2 and so forth. Stripes 503A–F may collectively or individually be referred to as stripes 503 or stripe 503. Each stripe 503, e.g., stripe 503A, may comprise a spare unit, e.g., spare unit 502G, configured to store data from a corresponding stripe unit 502 of a failed disk.

Figure 6A:
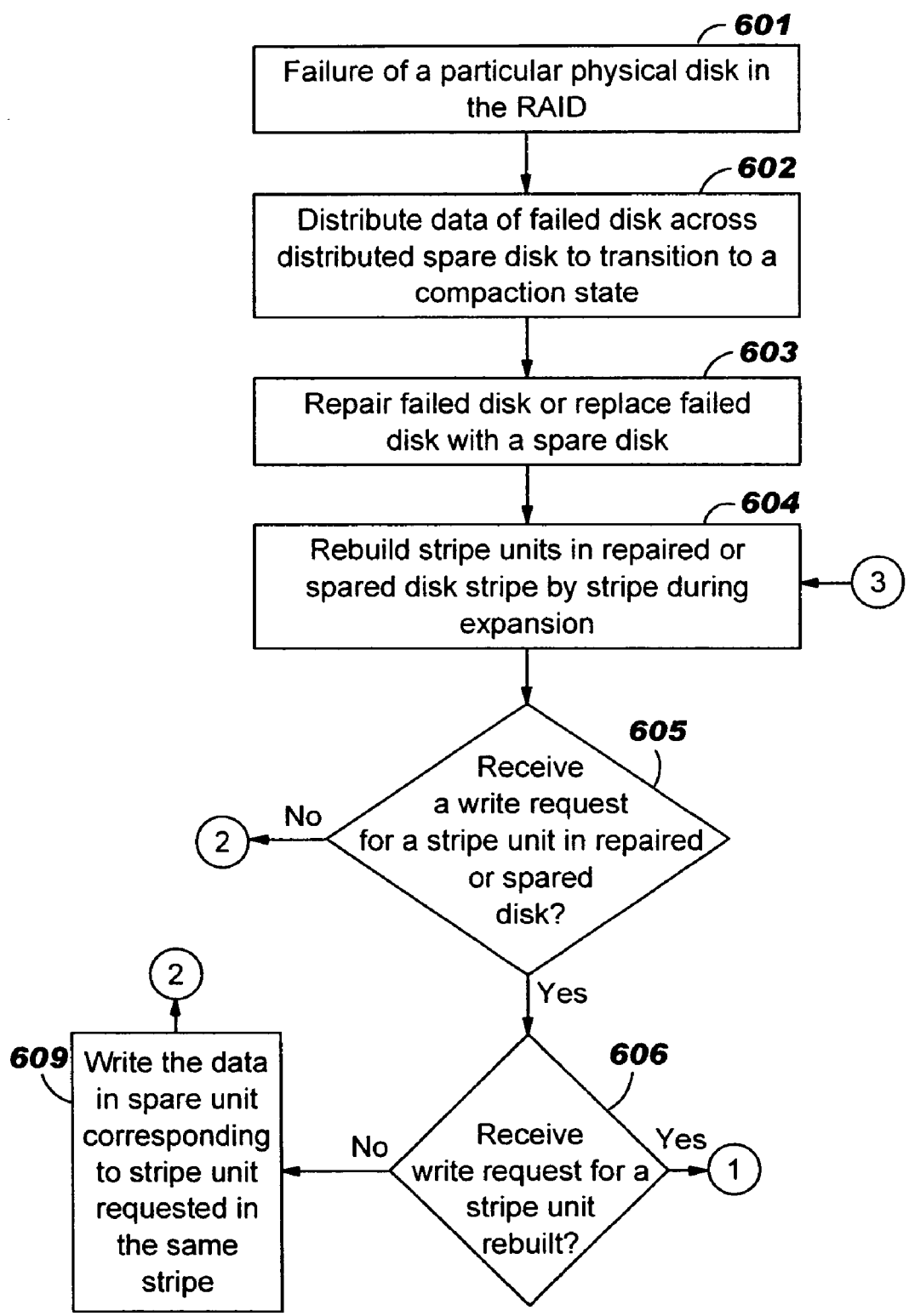
FIGS. 6A–B are a flowchart of a method for performing an expansion of a disk array while eliminating the necessity of tracking the stripes updated during expansion.
Figure 6B:
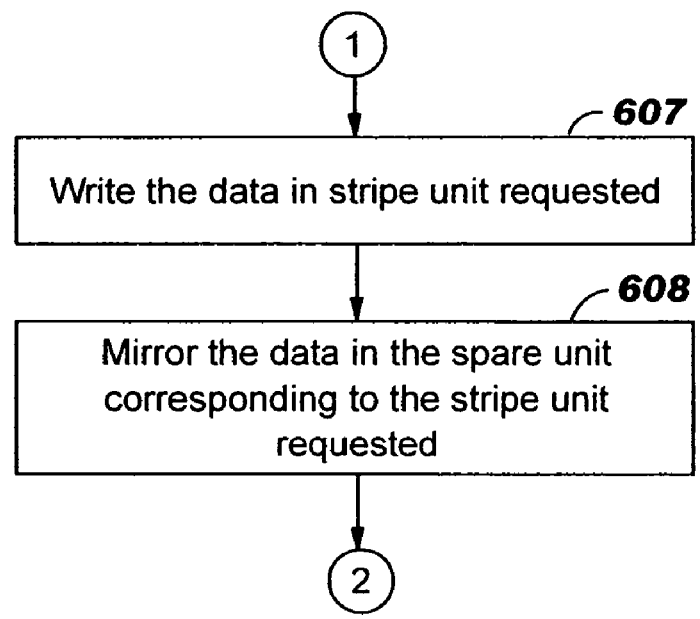
Figure 6B:
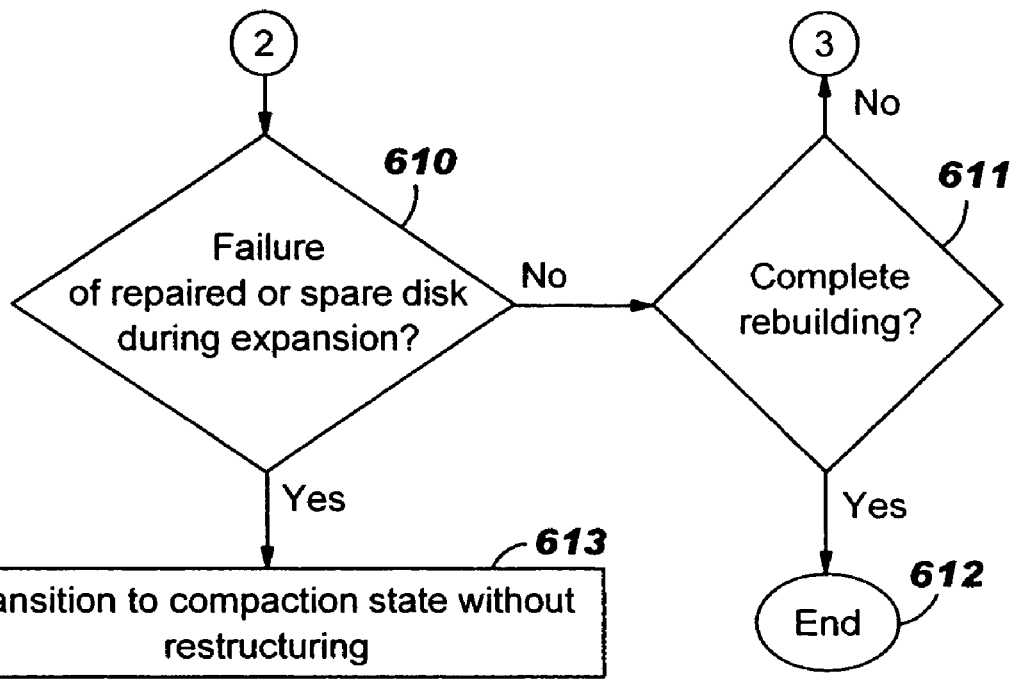

FIGS. 6A–B Method for Performing an Expansion of a Disk Array in a RAID Implementing a RAID Level Five With Distributed Sparing FIGS. 6A–B are a flowchart of one embodiment of the present invention of a method 600 for performing an expansion of a disk array in a RAID implementing a RAID level five with distributed sparing while eliminating the necessity of tracking the stripes updated during expansion. As stated in the Background Information section, during the expansion process of a disk array, each stripe that is updated, i.e., each stripe unit per stripe that is rebuilt in the repaired or spare disk, may be tracked. Typically, each stripe that is updated may be tracked by a table stored in a non-volatile memory in the server. Each stripe updated during the expansion process may be tracked in case the repaired or spare disk fails during the expansion process. If the repaired or spare disk fails during the expansion process, RAID is able to enter a compacted state since the last stripe updated is known. That is, the data that used to be on the failed disk up to the last stripe updated may be rebuilt to spare units distributed among the remaining disks in the disk array thereby allowing the disk array to enter a compacted state. However, tracking each stripe updated during expansion is time-consuming. Furthermore, non-volatile memory is expensive. It would therefore be desirable to eliminate the necessitating of tracking the stripes updated during expansion in order to enter a compacted state upon a failure of the updated disk during expansion. Method 600 is a method for performing an expansion of a disk array in a RAID implementing a RAID level five with distributed sparing while eliminating the necessity of tracking the stripes updated during expansion.

Referring to FIGS. 5 and 6A–B, in step 601, a physical disk 501 in a disk array in RAID storage system 130 (FIG. 1) may fail. For example, disk 501D may fail.

In step 602, upon the failure of a disk 501 in the disk array in RAID storage system 130, the data of the failed disk 501 may be distributed across spare units, e.g., spare unit 502G, spare unit 502N, spare unit 502D, spare unit 502K, spare unit 502R, to transition to a compaction state. As illustrated in FIG. 5, each stripe 503, e.g., stripe 503A, may comprise a spare unit, e.g., spare unit 502G, configured to store data from a corresponding stripe unit 502, e.g., stripe unit 502S, of a failed disk. For example, if disk 501D failed, then data labeled D1 in stripe unit 502S may be rebuilt in spare unit 502G labeled S0 in disk 501B. Data labeled D3 in stripe unit 502T may be rebuilt in spare unit 502N labeled S1 in disk 501C. Parity data labeled P3 in stripe unit 502V may be rebuilt in spare unit 502D labeled S3 in disk 501A and so forth. Hence the data that used to be on the failed disk, e.g., disk 501D, may be rebuilt to spare units, e.g., spare unit 502G, distributed among the remaining disks 501 in the disk array. The process of reconstructing the data contained on the failed disk 501, e.g., disk 501D, and copying it onto the spare unit of each stripe 503 may be referred to as "compaction." Once the data contained on the failed disk 501, e.g., disk 501D, has been rebuilt onto the spare unit, e.g., spare unit 502G, of each stripe 503, RAID storage system 130 may be said to be in a "compacted state." RAID storage system 130 may be said to be in a "compacted state" since the number of active disks 501, e.g., disks 501A–C, in the disk array is decreased by one.

In step 603, the failed disk 501, e.g., disk 501D, may be repaired or replaced with a spare disk 501.

Upon repairing the failed disk 501 or replacing the failed disk 501, stripe units 502 of the failed disk 501, e.g., disk 501D, may be rebuilt in step 604 stripe 503 by stripe 503 from the spare units distributed among other disks 501 of the disk array. The process of rebuilding stripe units 502 in the repaired or spare disk 501, e.g., disk 501D, may commonly be referred to as expansion. For example, if disk 501D had failed and been repaired or replaced, stripe units 502 in disk 501D may be rebuilt from the spare units during expansion as follows. Data labeled D1 in stripe unit 502S may be rebuilt from spare unit 502G labeled S0 in disk 501B. Data labeled D2 in stripe unit 502T may be rebuilt from spare unit 502N labeled S1 in disk 501C. Parity data labeled P3 in stripe unit 502V may be rebuilt from spare unit 502D labeled S3 in disk 501A. Data labeled D9 in stripe unit 502W may be rebuilt from spare unit 502K labeled S4 in disk 501B. Data labeled D11 in stripe unit 502X may be rebuilt from spare unit 502R labeled S5 in disk 501C.

During the expansion process, the following steps 605–611 may occur. In step 605, a determination may be made as to whether RAID controller 307 (FIGS. 3 and 4) received a write request to a stripe unit 502 in the repaired or spare disk 501, e.g., disk 501D. If RAID controller 307 has not received a write request to a stripe unit 502 of the repaired or spare disk 501, e.g., disk 501D, then a determination may be made as to whether the repaired or spare disk failed during the expansion process in step 610 as discussed further below.

If RAID controller 307 has received a write request to a stripe unit 502 of the repaired or spare disk 501, e.g., disk 501D, then a determination may be made in step 606 as to whether the received write request was a write request for a stripe unit 502 in the repaired or spare disk 501, e.g., disk 501D, that was rebuilt.

If RAID controller 307 received a write request for a stripe unit 502, e.g., stripe unit 502S, in the repaired or spare disk 501, e.g., disk 501D, that was rebuilt, then the data of the request may be written in stripe unit 502, e.g., stripe unit 502S, requested in step 607. In step 608, the data written may be mirrored, i.e., copied and stored, in the spare unit, e.g., spare unit 502G, corresponding to stripe unit 502, e.g., stripe unit 502S, requested. The spare unit, e.g., spare unit 502G, that corresponds to stripe unit 502, e.g., stripe unit 502S, requested resides in the same stripe 503, e.g., stripe 503A. For example, as stated above, each stripe unit 502 in the repaired or spare disk 501, e.g., disk 501D, may be rebuilt stripe 503 by stripe 503. If the repaired or spare disk 501 is disk 501D, then stripe unit 502S in stripe 503A may be rebuilt followed by stripe unit 502T in stripe 503B and so forth. If during that process, RAID controller 307 receives a write request for a stripe unit 502 recently built, e.g., stripe unit 502S, then the data of the write request may be written to stripe unit 502, e.g., stripe unit 502S, requested. Further, the data may be mirrored, i.e., copied and stored, in the spare unit, e.g., spare unit 502G, that corresponds to stripe unit 502, e.g., stripe unit 502S, requested. By mirroring the data to the corresponding spare unit, the step of tracking each stripe 503 that was updated during the expansion process may be eliminated since the disk array in RAID storage system 130 may already be configured to enter a compaction state upon failure of the replaced or spare disk 501 during the expansion process. The disk array may already be configured to enter a compaction state upon failure of the replaced or spare disk 501 during the expansion process since the spare units contain a copy of the valid data stored in corresponding stripe units 502 in the replaced or spare disk 501.

Upon mirroring the data in the spare unit, e.g., spare unit 502G, that corresponds to stripe unit 502, e.g., stripe unit 502S, requested, a determination may be made as to whether the repaired or spare disk failed during the expansion process in step 610 as discussed farther below.

If RAID controller 307 received a write request for a stripe unit 502, e.g., stripe unit 502S, in the repaired or spare disk 501, e.g., disk 501D, that was not rebuilt, then the data of the request may be written in the spare unit, e.g., spare unit 502R, that corresponds to stripe unit 502, e.g., stripe unit 502X, requested in step 609. The spare unit, e.g., spare unit 502R, that corresponds to stripe unit 502, e.g., stripe unit 502X, requested resides in the same stripe 503, e.g., stripe 503F. For example, if the repaired or spare disk 501 is disk 501D, then stripe unit 502S in stripe 503A may be rebuilt followed by stripe unit 502T in stripe 503B and so forth. If during that process, RAID controller 307 receives a write request for a stripe unit 502, e.g., stripe unit 502X, not yet built, then the data of the write request may be written to the spare unit, e.g., spare unit 502R, that corresponds to stripe unit 502, e.g., stripe unit 502X, requested. Upon writing the data in the spare unit, e.g., spare unit 502R, that corresponds to stripe unit 502, e.g., stripe unit 502X, requested, a determination may be made as to whether the repaired or spare disk failed during the expansion process in step 610 as discussed below.

As stated above, a determination may be made as to whether the repaired or spare disk 501, e.g., disk 501D, failed during the expansion process in step 610. If the repaired or spare disk 501 did not fail during the expansion process, a determination may be made as to whether the rebuilding of the repaired or spare disk 501, e.g., disk 501D, is complete in step 611. If the rebuilding of the repaired or spare disk 501 is completed, then method 600 is terminated in step 612. If the rebuilding of the repaired or spare disk 501 is not completed, then another stripe unit 502 in another stripe 503 in the repaired or spared disk 501, e.g., disk 501D, may be rebuilt in step 604.

If, however, the repaired or spare disk 501, e.g., disk 501D, failed during the expansion process, then the disk array in RAID storage system 130 may transition to the compaction state without any restructuring in step 613. That is, if the repaired or spare disk 501, e.g., disk 501D, failed during the expansion process, then the disk array in RAID storage system 130 may transition to the compaction state in zero time without any further data reconstruction/rearrangement. The disk array may transition to the compaction state without any restructuring since the spare units contain a copy of the valid data stored in stripe units 502 in the replaced or spare disk 501 during the expansion process as discussed above.

It is noted that even though method 600 describes a method for performing an expansion of a disk array while eliminating the necessity of tracking the stripes updated during expansion for a RAID level five system that the principles described in method 600 may be applicable to any redundant RAID level. It is further noted that a person of ordinary skill would be capable of applying the principles taught in method 600 to any redundant RAID level. It is further noted that method 600 may be executed in a different order presented and that the order presented in the discussion of FIGS. 6A–B are illustrative. It is further noted that certain steps in method 600 may be executed almost concurrently. It is further noted that steps 602–613 may be implemented by the firmware in RAID controller 307 residing in non-volatile memory 405 (FIG. 4) or ROM 404 (FIG. 4).

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for performing an expansion of a disk array comprising the steps of:
   rebuilding stripe units in a disk in said disk array stripe by stripe, wherein each disk in said disk array comprises a plurality of stripe units, wherein a stripe is a group of corresponding stripe units from each disk in said disk array;
   receiving a request to write data to a particular stripe unit in said disk during an expansion process;
   writing said data in said particular stripe unit in said disk if said particular stripe unit was rebuilt during said expansion process; and
   mirroring said data to a stripe unit that corresponds to said particular stripe unit in a same stripe if said particular stripe unit was rebuilt during said expansion process, wherein said mirror stripe unit is located in another disk of said disk array.

2. The method as recited in claim 1, wherein said mirror stripe unit is a spare unit, wherein said spare unit is a stripe unit configured to store data from a corresponding stripe unit in a failed disk.

3. The method as recited in claim 1 further comprising the step of:
   writing said data to said stripe unit that corresponds to said particular stripe unit in said same stripe if said particular stripe unit was not rebuilt during said expansion process.

4. The method as recited in claim 1 further comprising the step of:
   failing of said disk in said disk array during said expansion process.

5. The method as recited in claim 4 further comprising the step of:
   transitioning said disk array to a compaction state without restructuring, wherein said compaction state is a state of said disk array where all stripe units in said failed disk have been reconstructed and written to spare units distributed among said disk array, wherein each spare unit is a stripe unit configured to store data from a corresponding stripe unit in said failed disk.

6. A system, comprising:
   an array of disks, wherein each disk in said array of disks comprises a plurality of stripe units, wherein a stripe is a group of corresponding stripe units from each disk in said array of disks; and
   a controller coupled to said array of disks, wherein said controller is configured to manage said array of disks, wherein said controller comprises:
   a memory unit operable for storing a program for performing an expansion of said array of disks; and
   a processor coupled to said memory, wherein said processor, responsive to said program, comprises:
   circuitry operable for rebuilding stripe units in a disk in said array of disks stripe by stripe;

circuitry operable for receiving a request to write data to a particular stripe unit in said disk during an expansion process;

circuitry operable for writing said data in said particular stripe unit in said disk if said particular stripe unit was rebuilt during said expansion process; and circuitry operable for mirroring said data to a stripe unit that corresponds to said particular stripe unit in a same stripe if said particular stripe unit was rebuilt during said expansion process, wherein said mirror stripe unit is located in another disk of said array of disks.

7. The system as recited in claim 6, wherein said mirror stripe unit is a spare unit, wherein said spare unit is a stripe unit configured to store data from a corresponding stripe unit in a failed disk.

8. The system as recited in claim 6, wherein said controller further comprises:

circuitry operable for writing said data to said stripe unit that corresponds to said particular stripe unit in said same stripe if said particular stripe unit was not rebuilt during said expansion process.

9. The system as recited in claim 6, wherein said disk in said array of disks fails during said expansion process.

10. The system as recited in claim 9, wherein said controller further comprises:

circuitry operable for transitioning said array of disks to a compaction state without restructuring, wherein said compaction state is a state of said array of disks where all stripe units in said failed disk have been reconstructed and written to spare units distributed among said array of disks, wherein each spare unit is a stripe unit configured to store data from a corresponding stripe unit in said failed disk.

11. A system, comprising:

means for rebuilding stripe units in a disk in said disk array stripe by stripe, wherein each disk in said disk array comprises a plurality of stripe units, wherein a stripe is a group of corresponding stripe units from each disk in said disk array;

means for receiving a request to write data to a particular stripe unit in said disk during an expansion process;

means for writing said data in said particular stripe unit in said disk if said particular stripe unit was rebuilt during said expansion process; and means for mirroring said data to a stripe unit that corresponds to said particular stripe unit in a same stripe if said particular stripe unit was rebuilt during said expansion process, wherein said mirror stripe unit is located in another disk of said disk array.

12. The system as recited in claim 11, wherein said mirror stripe unit is a spare unit, wherein said spare unit is a stripe unit configured to store data from a corresponding stripe unit in a failed disk.

13. The system as recited in claim 11 further comprises:

means for writing said data to said stripe unit that corresponds to said particular stripe unit in said same stripe if said particular stripe unit was not rebuilt during said expansion process.

14. The system as recited in claim 11, wherein said disk in said disk array fails during said expansion process.

15. The system as recited in claim 14 further comprises:

means for transitioning said disk array to a compaction state without restructuring, wherein said compaction state is a state of said disk array where all stripe units in said failed disk have been reconstructed and written to spare units distributed among said disk array, wherein each spare unit is a stripe unit configured to store data from a corresponding stripe unit in said failed disk.

16. A computer program product embodied in a machine readable medium for performing an expansion of a disk array comprising the programming steps of:

rebuilding stripe units in a disk in said disk array strip by stripe, wherein each disk in said disk array comprises a plurality of stripe units, wherein a stripe is a group of corresponding stripe units from each disk in said disk array;

receiving a request to write data to a particular stripe unit in said disk during an expansion process;

writing said data in said particular stripe unit in said disk if said particular stripe unit was rebuilt during said expansion process; and mirroring said data to a stripe unit that corresponds to said particular stripe unit in a same stripe if said particular stripe unit was rebuilt during said expansion process, wherein said mirror stripe unit is located in another disk of said disk array.

17. The computer program product as recited in claim 16, wherein said mirror stripe unit is a spare unit, wherein said spare unit is a stripe unit configured to store data from a corresponding stripe unit in a failed disk.

18. The computer program product as recited in claim 16, further comprising the programming step of:

writing said data to said stripe unit that corresponds to said particular stripe unit in said same stripe if said particular stripe unit was not rebuilt during said expansion process.

19. The computer program product as recited in claim 16, wherein said disk in said disk array fails during said expansion process.

20. The computer program product as recited in claim 19 further comprising the programming step of:

transitioning said disk array to a compaction state without restructuring, wherein said compaction state is a state of said disk array where all stripe units in said failed disk have been reconstructed and written to spare units distributed among said disk array, wherein each spare unit is a stripe unit configured to store data from a corresponding stripe unit in said failed disk.

* * * * *